United States Patent
Park et al.

(10) Patent No.: US 10,776,996 B2
(45) Date of Patent: Sep. 15, 2020

(54) METHOD AND APPARATUS FOR PROCESSING IMAGE

(71) Applicant: Samsung Electronics Co., Ltd., Suwon-si (KR)

(72) Inventors: Seung In Park, Yongin-si (KR); Min Su Ahn, Seoul (KR); In Woo Ha, Yongin-si (KR); Kee Chang Lee, Seongnam-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 14/820,120

(22) Filed: Aug. 6, 2015

(65) Prior Publication Data

US 2016/0042558 A1 Feb. 11, 2016

(30) Foreign Application Priority Data

Aug. 6, 2014 (KR) .................. 10-2014-0101172

(51) Int. Cl.
  *G06T 15/50* (2011.01)
  *G06T 15/06* (2011.01)

(52) U.S. Cl.
  CPC ............ *G06T 15/506* (2013.01); *G06T 15/06* (2013.01)

(58) Field of Classification Search
  CPC .............................. G06T 15/506; G09G 5/393
  USPC .................................................. 345/426, 626
  See application file for complete search history.

(56) References Cited

U.S. PATENT DOCUMENTS

| | | | |
|---|---|---|---|
| 6,359,618 B1 | 3/2002 | Heirich | |
| 6,487,565 B1* | 11/2002 | Schechter | G06T 15/00 345/418 |
| 6,903,741 B2* | 6/2005 | Corbetta | G06T 15/60 345/426 |
| 8,629,871 B2 | 1/2014 | O'Brien et al. | |
| 2003/0128379 A1* | 7/2003 | Inoue | H04N 1/56 358/1.9 |
| 2003/0201995 A1* | 10/2003 | Farinelli | G06T 15/503 345/582 |
| 2008/0024623 A1* | 1/2008 | Seo | H04N 5/235 348/229.1 |
| 2010/0198877 A1 | 8/2010 | Gruenschloss et al. | |
| 2012/0046929 A1 | 2/2012 | Joshi et al. | |
| 2012/0051658 A1* | 3/2012 | Tong | G11B 27/034 382/224 |
| 2012/0206470 A1* | 8/2012 | Frank | H04N 1/4078 345/581 |
| 2013/0002671 A1* | 1/2013 | Armsden | G06T 15/06 345/426 |
| 2014/0098098 A1 | 4/2014 | Chauvier et al. | |

* cited by examiner

*Primary Examiner* — Yi Yang
(74) *Attorney, Agent, or Firm* — NSIP Law

(57) ABSTRACT

An image processing apparatus and method are provided. The image processing method may generate a mask for preventing a virtual light source from being sampled on an area of a current image frame based on virtual light source information of a previous image frame, applying the mask to the current image frame, sampling the virtual light source in the current image frame to which the mask is applied, and rendering the current image frame based on the virtual light source sampled in the current image frame.

19 Claims, 6 Drawing Sheets

METHOD AND APPARATUS FOR PROCESSING IMAGE

CROSS-REFERENCE TO RELATED APPLICATION

This application claims the benefit under 35 USC 119(a) of Korean Patent Application No. 10-2014-0101172, filed on Aug. 6, 2014, in the Korean Intellectual Property Office, the entire disclosure of which is incorporated herein by reference for all purposes.

BACKGROUND

1. Field

The following description relates to image processing technology for rendering three-dimensional (3D) graphics.

2. Description of Related Art

In various fields, such as a three-dimensional (3D) game, a virtual reality animation, and movie, for example, interest on real-time rendering of a 3D model is increasing. In the case of rendering a 3D scene using global illumination technology, an importance sampling for sampling virtual point lights (VPLs) having a relatively great effect within an image space is used. The importance sample refers to a method of determining a sampling location of a VPL and the number of VPLs to be sampled based on a feature of the image space. The importance sampling is used for a ray tracing based rendering using a Monte Carlo simulation and a radiosity based rendering.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image processing method includes generating a mask for preventing a virtual light source from being sampled on a reference area of a current image frame based on virtual light source information of a previous image frame, applying the mask to the current image frame, sampling the virtual light source in the current image frame to which the mask is applied, and rendering the current image frame based on the virtual light source sampled in the current image frame.

The generating of the mask may include: identifying, from the previous image frame, an area on which the virtual light source is sampled; and generating the mask for preventing the virtual light source from being sampled on the reference area of the current image frame corresponding to the identified area and a neighboring area of the reference area.

The generating of the mask may include scaling a size of the mask based on a size of the current image frame.

The rendering of the current image frame may include: applying the virtual light source sampled in the previous image frame to the current image frame; and rendering the current image frame based on the virtual light source sampled in the current image frame and the virtual light source of the previous image frame applied to the current image frame.

The foregoing and/or other aspects are achieved by providing an image processing method including: generating a mask for preventing a virtual light source from being sampled on a reference area of a current image frame based on virtual light source information of a previous image frame; applying the mask to the current image frame; dividing, into grid areas, the current image frame to which the mask is applied; sampling the virtual light source on an area of interest on which the virtual light source is to be sampled among the grid areas; and rendering the current image frame based on the virtual light source sampled in the current image frame.

The sampling of the virtual light source may include: determining a number of virtual light sources to be sampled on the area of interest; and sampling the virtual light source on the area of interest by the determined number of virtual light sources to be sampled.

The determining of the number of virtual light sources may include determining the number of virtual light sources to be sampled on the area of interest based on at least one of a light intensity distribution, a color distribution, and a flux distribution of the current image frame.

The mask may be represented as a low resolution texture, and the applying may include: scaling a size of the mask based on a size of the current image frame; and merging a texture of the scaled mask and a texture of the current image frame.

The foregoing and/or other aspects are achieved by providing an image processing apparatus including: a mask generator configured to generate a mask for preventing a virtual light source from being sampled on a reference area of a current image frame based on virtual light source information of a previous image frame; a virtual light source sampler configured to sample the virtual light source on the current image frame to which the mask is applied; and a renderer configured to render the current image frame based on the virtual light source sampled in the current image frame.

The mask generator may identify, from the previous image frame, an area on which the virtual light source is sampled, and may generate the mask for preventing the virtual light source from being sampled on the reference area of the current image frame corresponding to the identified area and a neighboring area of the reference area.

The mask may be represented as a low resolution texture, and a size of the mask may be scaled using a hardware acceleration function of a graphic processing unit (GPU) in response to applying the mask to the current image frame.

The virtual light source sampler may include an area divider configured to divide, into grid areas, the current image frame to which the mask is applied.

The virtual light source sampler may sample the virtual light source on an area of interest on which the virtual light source is to be sampled among the grid areas.

The virtual light source sampler may determine a number of virtual light sources to be sampled for each grid area, and may sample the virtual light source on an area of interest on which the virtual light source is to be sampled based on the determined number of virtual light sources to be sampled.

Additional aspects of example embodiments will be set forth in part in the description which follows and, in part, will be apparent from the description, or may be learned by practice of the disclosure.

DETAILED DESCRIPTION

Figure 1:
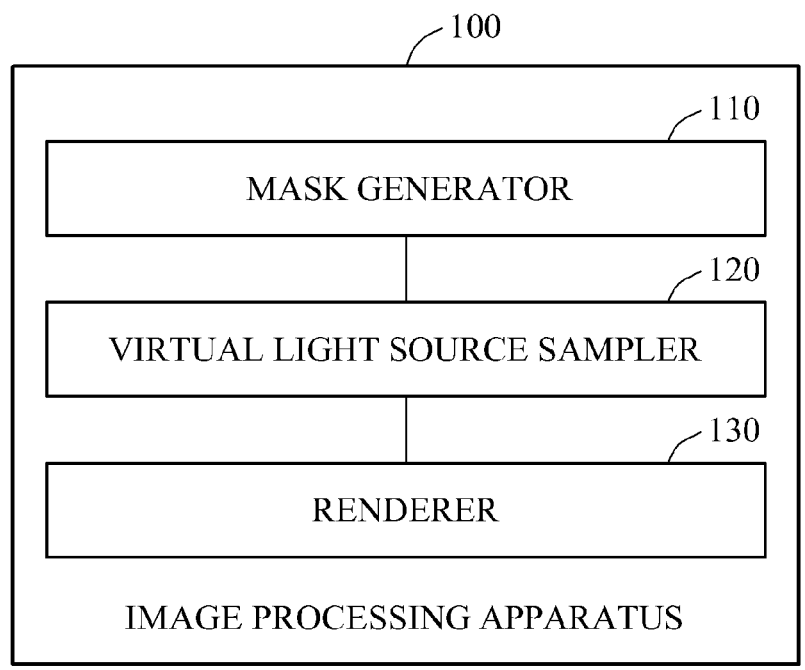
FIG. 1 illustrates an example of an image processing apparatus.

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of an image processing apparatus. The image processing apparatus 100 may be disposed within, for example, a personal computer (PC), a smartphone, and a tablet PC, to render a three-dimensional (3D) image. For example, the image processing apparatus 100 may render 3D graphics in the field of a game, a movie, a user interface, a virtual reality, and an augmented reality. The image processing apparatus 100 may render a current image frame as an input image and may output a rendered image of the current image frame. The image processing apparatus 100 may generate a virtual space by rendering the current image frame, and may dispose a virtual object within the virtual space. The virtual space may refer to a predetermined environment that is represented as 3D graphics.

The image processing apparatus 100 may dispose virtual light sources such as a virtual point lights (VPLs) or indirect light sources on the virtual space or the virtual object in order to achieve a global illumination effect in the virtual space. The image processing apparatus 100 may represent natural phenomena such as reflection, refraction, and diffusion of light in a rendered image by disposing the virtual light sources on the virtual space or the virtual object. The image processing apparatus 100 may control an illumination effect represented on the rendered image by adjusting an area on which a virtual light source is to be disposed, or the number of virtual light sources to be disposed on the area.

The image processing apparatus 100 may perform a virtual light source sampling process to determine a virtual light source to be disposed on the virtual space. Through the virtual light source sampling process, an area of the virtual space and the number of virtual light sources to be disposed on the area may be determined. The image processing apparatus 100 may sample a virtual light source in the current image frame based on features such as a light intensity, a color, and a flux of an image space area but is not limited thereto. That is, the image processing apparatus 100 may sample the virtual light source in the current image frame based on other features. For example, the image processing apparatus 100 may sample a virtual light source in a result image of light view rendering of the current image frame, or may sample a virtual light source using a ray tracing method about a light.

The image processing apparatus 100 may sample a virtual light source based on temporal coherence between image frames included in an input image. For example, in the case of rendering a 3D graphic animation, the continuity of data is present between temporally continuous image frames and thus, a previous image frame and a current image frame may represent similar scenes. The previous image frame refers to a frame temporally ahead the current image frame and to an image frame in which a virtual light source is sampled before the current image frame. In the case of image frames in which the continuity of data is present, all of or a portion of virtual light sources sampled in the previous image frame may be used again for the current image frame.

When sampling a virtual light source in the current image frame, the image processing apparatus 100 may use information about the virtual light source sampled in the previous image frame. The image processing apparatus 100 may selectively sample a virtual light source on an area of interest instead of using the entire area of the current image frame, based on virtual light source information of the previous image frame. For example, the image processing apparatus 100 may sample a virtual light source on a remaining area excluding, from the current image frame, the area on which the virtual light source is already sampled. By sampling a virtual light source only on an area of interest, the calculation efficiency may be enhanced and the virtual light source may be quickly sampled.

For example, when the image processing apparatus 100 samples a virtual light source in the current image frame using an importance sampling method, information to be excluded from the virtual light source sampling process may be applied to an importance map and a weight of a portion to be excluded may be set to be relatively low. When sampling a virtual light source using an importance sampling method, an area on which the virtual light source is to be sampled may be determined based on a light intensity distribution of an image frame, a bidirectional reflection distribution function (BRDF), and a bidirectional surface scattering reflectance distribution function (BSSRDF). For example, the importance map may include probability distribution information determined based on a light intensity value of each pixel included in the image frame. Using the importance sampling, an area on which a virtual light source is to be sampled may be determined based on probability distribution information included in the importance map. A bright area on the importance map may be set to have a relatively high probability that a virtual light source is to be sampled, compared to a dark area.

The image processing apparatus 100 may apply, to the current image frame, the virtual light source sampled in the previous image frame, and may render the current image frame based on virtual light sources additionally sampled in the current image frame. The image processing apparatus 100 may decrease an occurrence of a flickering phenomenon and may further quickly perform rendering by applying, to the current image frame, the virtual light source sampled in the previous image frame. Also, since the virtual light source sampled in the previous image frame is applied to the current image frame, a resource such as a shadow map for each virtual light source may be recycled. The image processing apparatus 100 may relocate a virtual light source based on the virtual light source of the previous image frame and an illumination environment of the current image frame, thereby preventing a degradation in the rendering quality.

Referring to FIG. 1, the image processing apparatus 100 may include a mask generator 110, a virtual light source sampler 120, and a renderer 130. Although FIG. 1 illustrates the mask generator 110, the virtual light source sampler 120 and the renderer 130 included in the image processing apparatus 100, the mask generator 110, the virtual light source sampler 120 and the renderer 130 may be embodied as independent hardware.

The mask generator 110 may select a target to be excluded from a virtual light source sampling process and may generate a mask of the selected target. For example, the mask generator 110 may select, as the target to be excluded from the virtual light source sampling process, an area on which a virtual light source is sampled in a previous image frame, a characteristic of the virtual light source such as a predetermined reflection direction of light, and geometric information of an object model. Geometric information of the object model may include information about a visibility of the object model and an ambient occlusion.

For example, when an area on which the virtual light source is sampled in a previous image frame is selected as a target to be excluded from a virtual light source sampling process, the mask generator 110 may generate a mask for preventing a virtual light source from being sampled again on the area on which the virtual light source is already sampled in the previous image frame. Using the mask, the virtual light source may be sampled on a remaining area excluding, from the current image frame, the area on which the virtual light source is sampled in the previous image frame. As another example, when the predetermined reflection direction of light is selected as the target to be excluded, the virtual light source may be sampled based on a remaining reflection direction excluding the predetermined reflection direction in ray tracing based rendering.

The mask generator 110 may generate a mask for preventing a virtual light source from being sampled on an area of the current image frame based on virtual light source information of the previous image frame. For example, virtual light source information of the previous image frame may include an area on which a virtual light source is sampled in the previous image frame and the number of sampled virtual light sources. The mask may function as a filter configured to filter a rendered virtual light source in the previous image frame when sampling the virtual light source of the current image frame.

For example, the mask generator 110 may identify, from the previous image frame, an area on which a virtual light source is sampled, and may generate a mask for preventing the virtual light source from being sampled on a reference area of the current image frame corresponding to the identified area and a neighboring area of the reference area. When an importance sampling is performed based on an intensity value of a pixel, an intensity value of a pixel included in the reference area within the current image frame may be set to be relatively low by the mask. For example, when an intensity value of a pixel is within the range of "0" indicating black and "255" indicating white, the intensity value of the pixel included in the reference area may be set to "0" by the mask on the importance map about the current image frame to which the mask is applied.

The mask generated by the mask generator 110 may be represented as a texture. The mask represented as the texture may include information, such as a location of the virtual light source, for example, to be excluded from the virtual light source sampling process. For example, the mask may be represented as a texture having a resolution equal to or lower than a resolution of the current image frame. The mask may be stored in a form of the texture in a storage space, for example, a texture GPU memory within a GPU.

The virtual light source sampler 120 may apply the mask to the current image frame, and may sample the virtual light source in the current image frame to which the mask is applied. When applying the mask to the current image frame, the mask may be scaled to a size of the current image frame using a hardware acceleration function of the GPU, and an interpolation operation about the texture may be performed. Additionally, it is note that the interpolation operation about the texture may be performed automatically. The scaled mask may mask a reference area of the current image frame and a neighboring area of the reference area. Through the scaling process, the mask may prevent the virtual light source from being sampled on the reference area and the neighboring area of the reference area. The virtual light source sampler 120 may quickly merge the mask and the current image frame using the GPU. The virtual light source sampling unit 120 may merge a texture of the mask and a texture of the current image frame using the hardware acceleration function provided from the GPU.

According to example embodiments, instead of using a texture, the virtual light source sampler 120 may store a mask and a current image frame in a memory space and may apply the mask to the current image frame by blending the mask and the current image frame.

The virtual light source sampler 120 may generate an importance map from the current image frame to which the mask is applied. On the importance map about the current image frame, the reference area and the neighboring area of the reference area may be set to have a relatively low weight by the mask. A relatively low weight of an area on the importance map indicates that a sampling probability of a virtual light source on the corresponding area is relatively low. The virtual light source sampler 120 may perform importance sampling using the generated importance map. Through the importance sampling, a sampling probability of a virtual light source may be determined based on an intensity or light intensity, a color, or a flux of an image space, and determined probability information may be represented as the importance map. In the importance sampling, a virtual light source may be sampled based on probability information included in the importance map. For example, through the importance sampling, intensity values of pixels included in the current image frame may be normalized to the entire intensity value of the current image frame. A virtual light source may be sampled on a pixel area corresponding to a largest normalized intensity value.

The renderer 130 may render the current image frame based on the virtual light source sampled in the current image frame. The renderer 130 may apply the virtual light source sampled in the previous image frame to the current image frame, and may render the current image frame based on the virtual light source sampled in the current image frame and the virtual light source of the previous image frame applied to the current image frame. For example, the renderer 130 may project virtual light sources sampled in the previous image frame onto an image space of the current image frame using a view matrix, a projection matrix, and an object model-by-object model matrix, but is not limited thereto. Using the virtual light source sampled in the current image frame and the virtual light source of the previous image frame applied to the current image frame, the global illumination effect may be configured on the image space of the current image frame.

Figure 2:
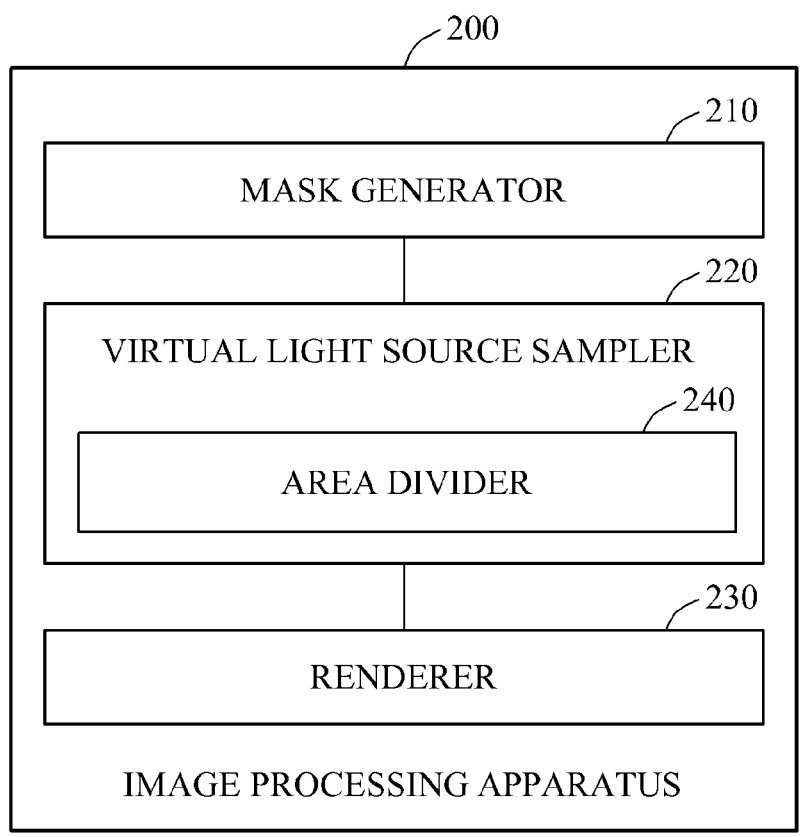
FIG. 2 illustrates another example of an image processing apparatus.

FIG. 2 illustrates another example of an image processing apparatus. The image processing apparatus 200 may divide, into areas, a current image frame to which a mask is applied before sampling a virtual light source in the current image frame. The image processing apparatus 200 may selectively sample a virtual light source on an area of interest on which the virtual light source is to be selectively sampled among the areas. Referring to FIG. 2, the image processing apparatus 200 may include a mask generator 210, a virtual light source sampler 220, and a renderer 230. The virtual light source sampler 220 may include an area divider 240.

The mask generator 210 may select a target to be excluded from a virtual light source sampling process and may generate a mask of the selected target. For example, the mask generator 210 may select, as the target to be excluded from the virtual light source sampling process, an area on which a virtual light source is sampled in a previous image frame, a characteristic of the virtual light source such as a predetermined reflection direction of light, and geometric information of an object model. The mask generator 210 may generate the mask for preventing the virtual light source from being sampled on an area of the current image frame based on virtual light source information of the previous image frame. The mask may be stored in a form of a texture in a storage space of a GPU. For example, the mask may be represented as a texture having a resolution equal to or lower than a resolution of the current image frame, and may include information, for example, a location of the virtual light source, to be excluded from the virtual light source sampling process. A description related to an operation of the mask generator 210 of FIG. 2 may refer to the description made above in relation to the mask generator 110 of FIG. 1.

The virtual light source sampler 220 may apply the mask to the current image frame. When applying the mask to the current image frame, the mask may be scaled to a size of the current image frame using a hardware acceleration function of the GPU, and an interpolation operation about the texture may be performed. Additionally, the interpolation operation about the texture may be performed automatically. The scaled mask may mask a reference area of the current image frame and a neighboring area of the reference area. The virtual light source sampler 220 may merge a texture of the mask and a texture of the current image frame using, for example, the hardware acceleration function of the GPU.

Alternatively, instead of using a texture, the virtual light source sampler 220 may store a mask and a current image frame in a memory space and may apply the mask to the current image frame by blending or combining the mask and the current image frame.

The area divider 240 may divide, into areas, the current image frame to which the mask is applied. For example, the area divider 240 may divide, into grid areas, the current image frame to which the mask is applied. The virtual light source sampler 220 may selectively sample a virtual light source only on an area of interest on which the virtual light source is to be sampled, among the grid areas. The area of interest may be determined by a user, or may be determined based on a light intensity distribution within the current image frame or a motion of an object. For example, among the grid areas included in the current image frame, a bright area may be determined as the area of interest. Alternatively, a grid area in which a moving object is present may be determined as the area of interest.

The virtual light source sampler 220 may generate an importance map for each grid area. Importance maps of the grid areas may be generated at a high rate through a parallel calculation. The virtual light source sampler 220 may not generate an importance map of a grid area on which sampling of a virtual light source is determined to not be required.

The virtual light source sampler 220 may generate an individual importance map for each area of interest, and may perform importance sampling on an area of interest using the generated importance map. The virtual light source sampler 220 may generate importance maps of the areas of interests to be in parallel. When sampling a virtual light source in the current image frame, sampling of the virtual light source on the entire area may not be required. By sampling a virtual light source only on some areas of interests on which the virtual light source is to be sampled from the entire area of the current image frame, it is possible to quickly sample the virtual light source.

The virtual light source sampler 220 may determine the number of virtual light sources to be sampled for each grid area, and may sample a virtual light source on an area of interest by the determined number of virtual light sources to be sampled. The virtual light source sampler 220 may determine the number of virtual light sources to be sampled on the area of interest based on at least one of an intensity value distribution, a color distribution, and a flux distribution of the current image frame. However, the scope of the example embodiments is not limited to the intensity value distribution, the color distribution, and the flux distribution of the current image frame. The virtual light source sampler 220 may determine the number of virtual light sources to be sampled on the area of interest based on a variety of information. When sampling a virtual light source only on the area of interest, it is important to allocate an appropriate number of virtual light sources to be sampled for each grid area so that a virtual light source sampling distribution may satisfy a distribution based on interest information of the current image frame.

For example, when performing an importance sampling based on an intensity value, the virtual light source sampler 220 may determine the number of virtual light sources to be sampled for each grid area, based on a ratio between the entire intensity value of the current image frame and an intensity value of each grid area. The virtual light source sampler 220 may determine a total number of virtual light sources to be sampled in the current image frame, and may determine the number of virtual light sources to be sampled on a corresponding area of interest by applying a ratio between the entire intensity value of the current image frame and an intensity value of the area of interest to the determined number of virtual light sources to be sampled.

For example, when performing an importance sampling based on a flux value, the virtual light source sampler 220 may determine a sampling weight of each grid area based on a ratio between a flux summation of the entire area of the current image frame and a flux summation of each grid area. The virtual light source sampler 220 may determine the number of virtual light sources to be sampled on the respective grid areas by multiplying the determined sampling weight and the determined total number of virtual light sources to be sampled. The virtual light source sampler 220 may use a hardware acceleration function of a GPU using a low resolution texture or a texture mip-mapping during a process of calculating a flux summation of the entire area of the current image frame and a flux summation of each grid area.

The renderer 230 may render the current image frame based on the virtual light source sampled in the current image frame. The renderer 230 may apply the virtual light source sampled in the previous image frame to the current image frame, and may render the current image frame based on the virtual light source sampled in the current image frame and the virtual light source of the previous image frame applied to the current image frame. A description related to an operation of the renderer 230 of FIG. 2 may refer to the description made above in relation to the renderer 130 of FIG. 1.

Figure 3:
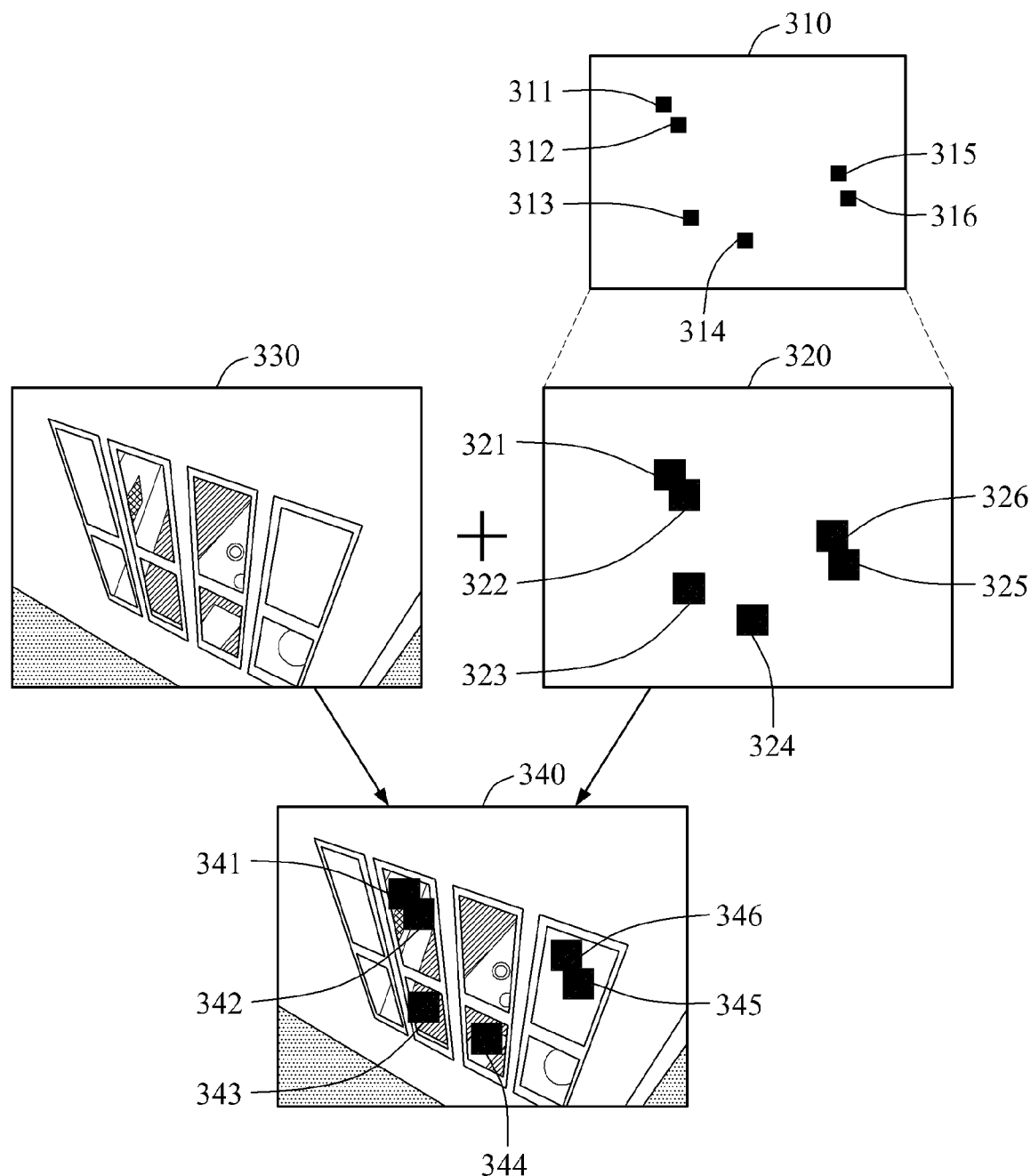
FIG. 3 illustrates an example of an operation of sampling a virtual light source on a current image frame.

FIG. 3 illustrates an example of an operation of sampling a virtual light source in a current image frame. For example, FIG. 3 illustrates a method of representing a virtual light source based on an instant radiosity method as an example of generating and representing the virtual light source to achieve a global illumination effect of a 3D scene. Here, the scope of example embodiments is not limited thereto, and thus a variety of virtual light source representation methods may be employed.

When rendering a 3D graphic animation, the continuity of data or scenes may be present between temporally continuous image frames. Accordingly, a portion of virtual light sources sampled in a previous image frame may also be reused in the current image frame. When reusing a sampling result of virtual light sources performed in the previous image frame, duplication is to be eliminated by sampling a virtual light source on a remaining area excluding an area on which the reused virtual light sources are rendered, for example, an area on which virtual light sources are already sampled in the previous image frame. To eliminate the duplication from a virtual light source sampling process, an image processing apparatus according to example embodiments may apply an area to be excluded from the virtual light source sampling process to an importance map, and may perform an importance sampling using the importance map.

Referring to FIG. 3, an image 330 refers to a rendered image of a current image frame directly observed at a view of a light source to sample a virtual light source corresponding to an indirect light source. Prior to sampling a virtual light source to the current image frame, the image processing apparatus may generate a mask 310 represented as a texture based on an area on which the virtual light source is sampled or rendered in a previous image frame. For example, the mask 310 may be represented as a texture having a resolution equal to or lower than a resolution of the current image frame. Areas 311, 312, 313, 314, 315, and 316 included in the mask 310 are reference areas corresponding to areas on which virtual light sources are sampled in the previous image frame and may be set to have a relatively low probability that a virtual light source is to be sampled.

The image processing apparatus may scale the mask 310 to be suitable for a size of the current image frame using a hardware acceleration function of a GPU. Areas 321, 322, 323, 324, 325, and 326 included in a scaled mask 320 are areas scaled from the areas 311, 312, 313, 314, 315, and 316 through an interpolation process during a scaling process of the mask 310. As a size of the mask 310 is extended, a size of each of the areas 311, 312, 313, 314, 315, and 316 may also be extended through a texture interpolation process of the GPU. The areas 321, 322, 323, 324, 325, and 326 extended through the scaling process may mask a reference area of the current image frame and a neighboring area of the reference area. For example, when the size of the mask 310 is 256×256 and a size of the image 330 with respect to the current image frame is 512×512, the image processing apparatus may extend the size of the mask 310 to be 512×512. During this process, the areas 311, 312, 313, 314, 315, and 316 included in the mask 310 may be extended through the interpolation process.

An image 340 refers to an image acquired by combining a texture of the image 330 corresponding to the rendered image of the current image frame and a texture of the scaled mask 320 through blending. In the image 340, that is the rendered image with respect to the current image frame, areas 341, 342, 343, 344, 345, and 346 refer to areas corresponding to areas on which virtual light sources are sampled in the previous image frame and may be set to have a relatively low probability that a virtual light source is to be sampled. For example, when the image processing apparatus performs an importance sampling based on an intensity value of a pixel, the intensity value may decrease on the areas 341, 342, 343, 344, 345, and 346 and a virtual light source sampling probability may also decrease. As a result of the importance sampling, a virtual light source may be sampled on a remaining area excluding the areas 341, 342, 343, 344, 345, 346 in the current image frame.

Figure 4:
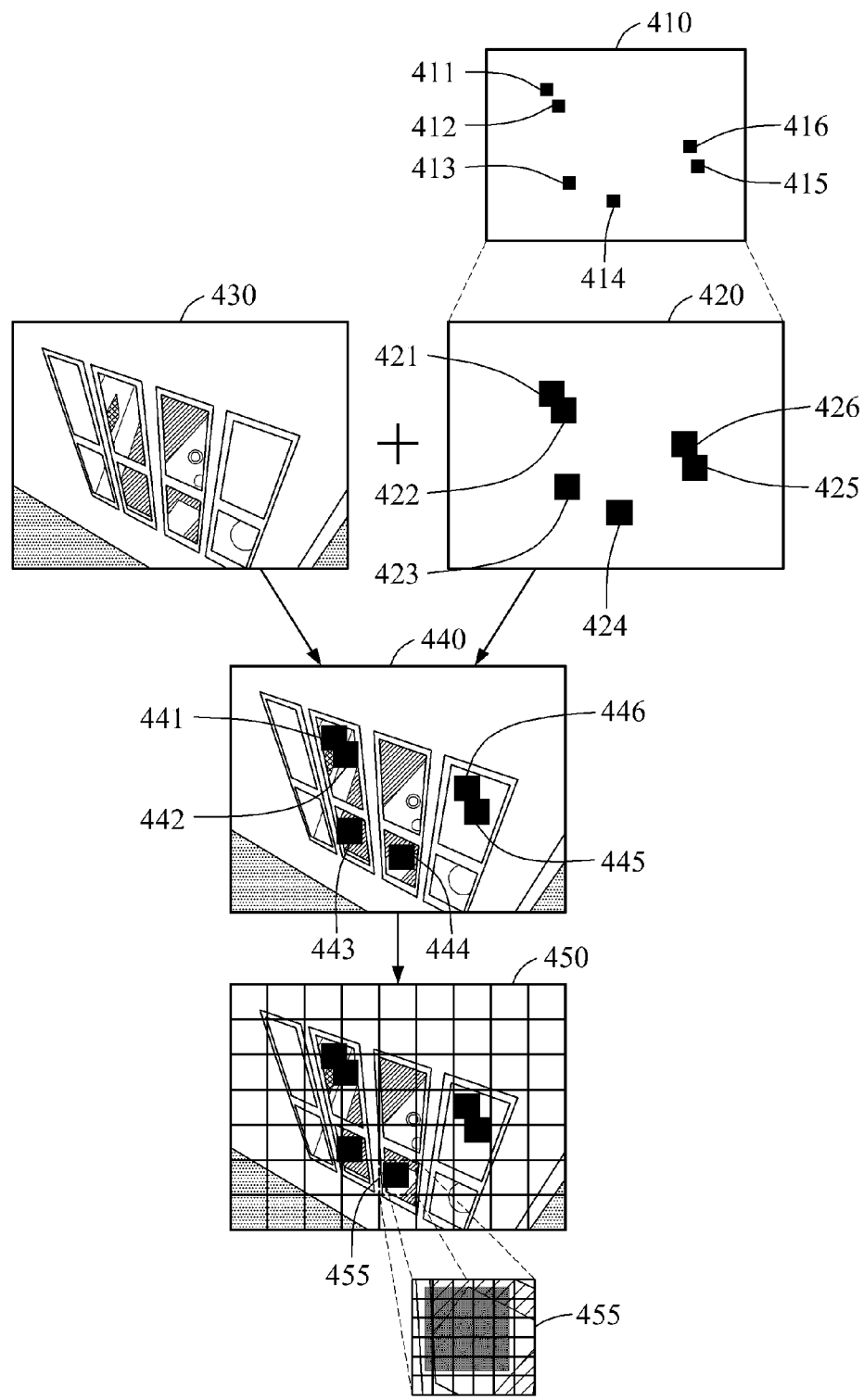
FIG. 4 illustrates another example of an operation of sampling a virtual light source on a current image frame.

FIG. 4 illustrates another example of an operation of sampling a virtual light source in a current image frame. When performing an importance sampling to sample a virtual light source, an image processing apparatus according to an example may selectively sample the virtual light source only on an area of an image space. For example, the image processing apparatus may divide the current image frame into grid areas, and may sample a virtual light source only on an area of interest on which the virtual light source is to be sampled among the grid areas. The image processing apparatus may efficiently sample a virtual light source at a high rate by sampling the virtual light source only on an area of interest instead of performing a sampling on the entire area of the image space.

Referring to FIG. 4, an image 430 refers to a rendered image of a current image frame directly observed at a view of a light source to sample a virtual light source corresponding to an indirect light source. The image processing apparatus may generate a mask 410 represented as a texture based on information on an area on which a virtual light source is sampled or rendered in a previous image frame. For example, the mask 410 may be represented as a texture having a resolution equal to or lower than a resolution of the current image frame. Areas 411, 412, 413, 414, 415, and 416 included in the mask 410 are reference areas corresponding to areas on which virtual light sources are sampled in the previous image frame.

The image processing apparatus may scale the mask 410 to be suitable for a size of the current image frame using a hardware acceleration function of a GPU. Areas 421, 422, 423, 424, 425, and 426 included in a scaled mask 420 are areas scaled from the areas 411, 412, 413, 414, 415, and 416 through an interpolation process during a scaling process of the mask 410. As a size of the mask 410 is extended, a size of each of the areas 411, 412, 413, 414, 415, and 416 may also be extended through a texture interpolation process of the GPU. The areas 421, 422, 423, 424, 425, and 426 extended through the scaling process may mask a reference area of the current image frame and a neighboring area of the reference area.

An image 440 refers to an image acquired by combining a texture of the image 430 corresponding to the rendered image of the current image frame and a texture of the scaled mask 420 through blending. In the image 440, that is the rendered image with respect to the current image frame, areas 441, 442, 443, 444, 445, and 446 refer to areas corresponding to areas on which virtual light sources are sampled in the previous image frame and may be set to have a relatively low probability that a virtual light source is to be sampled.

The image processing apparatus may further divide, into grid areas, the current image frame to which the scaled mask 420 is applied. An image 450 refers to an example in which the current image frame is divided into the grid areas. The image processing apparatus may select an area of interest on which a virtual light source is to be sampled from among the grid areas included in the image 450, and may generate an importance map of the selected area of interest. The image processing apparatus may perform an importance sampling using the importance map of the area of interest, and may sample a virtual light source on the area of interest. For example, when a grid area 455 is determined as the area of interest, the image processing apparatus may generate an importance map of the grid area 455 based on intensity values of pixels included in the grid area 455, and may sample a virtual light source on the grid area 455 using the importance map.

When sampling a virtual light source on an area of interest, the image processing apparatus may allocate an appropriate number of virtual light sources to be sampled for each area of interest. For example, the image processing apparatus may determine to sample three virtual light sources on the grid area 455 based on an intensity distribution of the current image frame and intensity information of the grid area 455. The image processing apparatus may generate the importance map of the grid area 455, and may sample three virtual light sources within the grid area 455 based on probability information displayed on the importance map.

Figure 5:
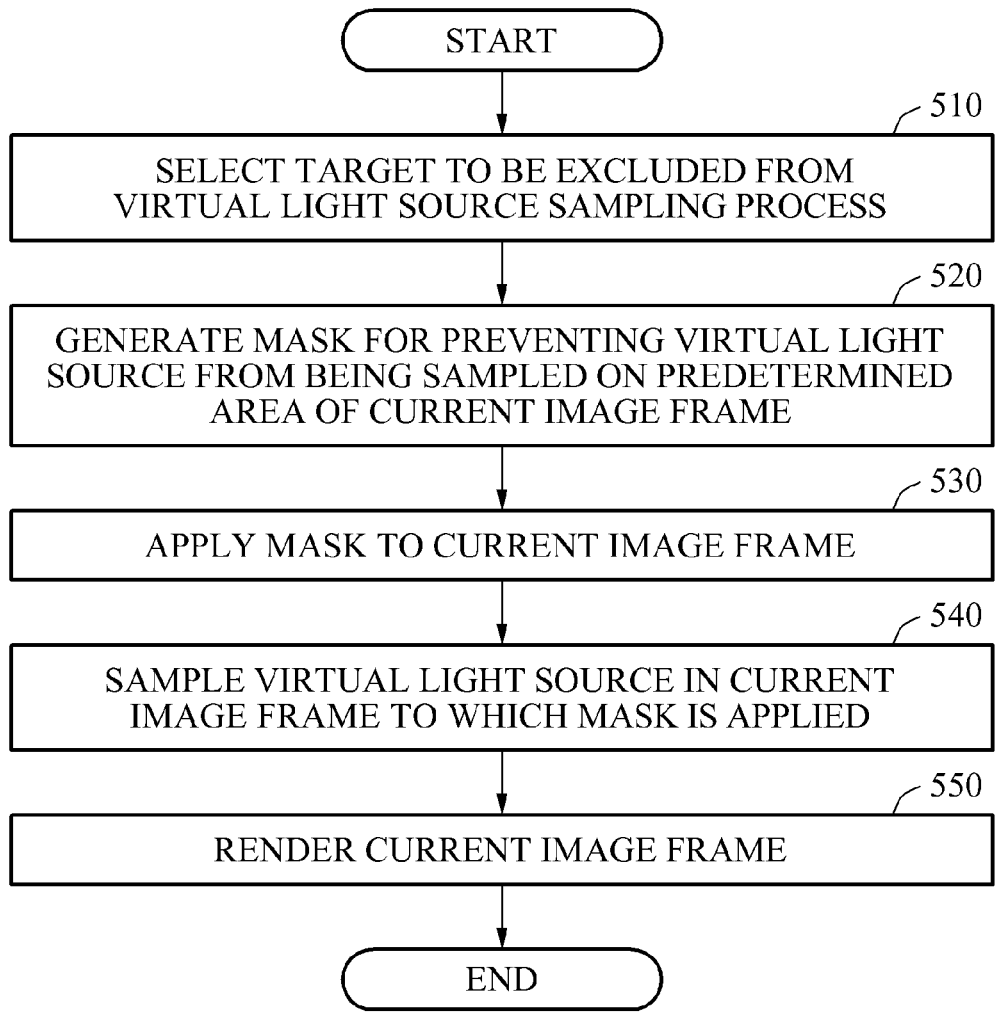
FIG. 5 illustrates an example of an image processing method.

FIG. 5 illustrates an example of an image processing method.

In operation 510, an image processing apparatus according to an example may select a target to be excluded from a virtual light source sampling process. For example, the image processing apparatus may select, as the target to be excluded from the virtual light source sampling process, an area on which a virtual light source is sampled in a previous image frame, a characteristic of the virtual light source such as a predetermined reflection direction of light, and geometric information of an object model.

In operation 520, the image processing apparatus may generate a mask for preventing a virtual light source from being sampled on an area of the current image frame based on virtual light source information of the previous image frame. The image processing apparatus may generate a mask of the selected target. The image processing apparatus may generate the mask based on at least one of information about an area on which a virtual light source is sampled in the previous image frame, characteristic information of the virtual light source, and geometric information of the object model. For example, the image processing apparatus may identify, from the previous image frame, an area on which a virtual light source is sampled, and may generate a mask for preventing the virtual light source from being sampled on a reference area of the current image frame corresponding to the identified area and a neighboring area of the reference area.

The mask may be represented as a texture. For example, the mask may be represented as a texture having a resolution equal to or lower than a resolution of the current image frame. The mask represented as the texture may include information, for example, a location of the virtual light source to be excluded from a virtual light source sampling process.

In operation 530, the image processing apparatus may apply the generated mask to the current image frame, but is not limited thereto. The image processing apparatus may scale a size of the mask based on a size of the current image frame. For example, the image processing apparatus may scale the size of the mask to the size of the current image frame using a hardware acceleration function of a GPU. When applying the mask to the current image frame, the mask may be scaled to the size of the current image frame using the hardware acceleration function of the GPU, and an interpolation operation about the texture may be automatically performed. The scaled mask may mask a reference area of the current image frame and a neighboring area of the reference area. The image processing apparatus may quickly merge a texture of the mask and a texture the current image frame using the hardware acceleration function of the GPU.

Alternatively, instead of using the texture, the image processing apparatus may apply the mask to the current image frame by storing the mask and the current image frame in a memory space and then blending the mask and the current image frame.

In operation 540, the image processing apparatus may sample the virtual light source in the current image frame to which the mask is applied. The image processing apparatus may sample a virtual light source based on intensity values of pixels in the current image frame to which the mask is applied. For example, the image processing apparatus may generate an importance map based on an intensity value in the current image frame to which the mask is applied, and may sample the virtual light source in the current image frame by performing an importance sampling using the importance map. In the importance sampling, a probability that a virtual light source is to be sampled at a location of a corresponding pixel may increase according to an increase in an intensity value of the pixel. Due to the mask, an intensity value of a pixel may decrease on an area of the current image frame to which the mask is applied and a probability that a virtual light source is to be sampled on the corresponding area may also decrease.

In operation 550, the image processing apparatus may render the current image frame. The image processing apparatus may apply the virtual light source sampled in the previous image frame to the current image frame, and may render the current image frame based on the virtual light source sampled in the current image frame and the virtual light source of the previous image frame applied to the current image frame.

Figure 6:
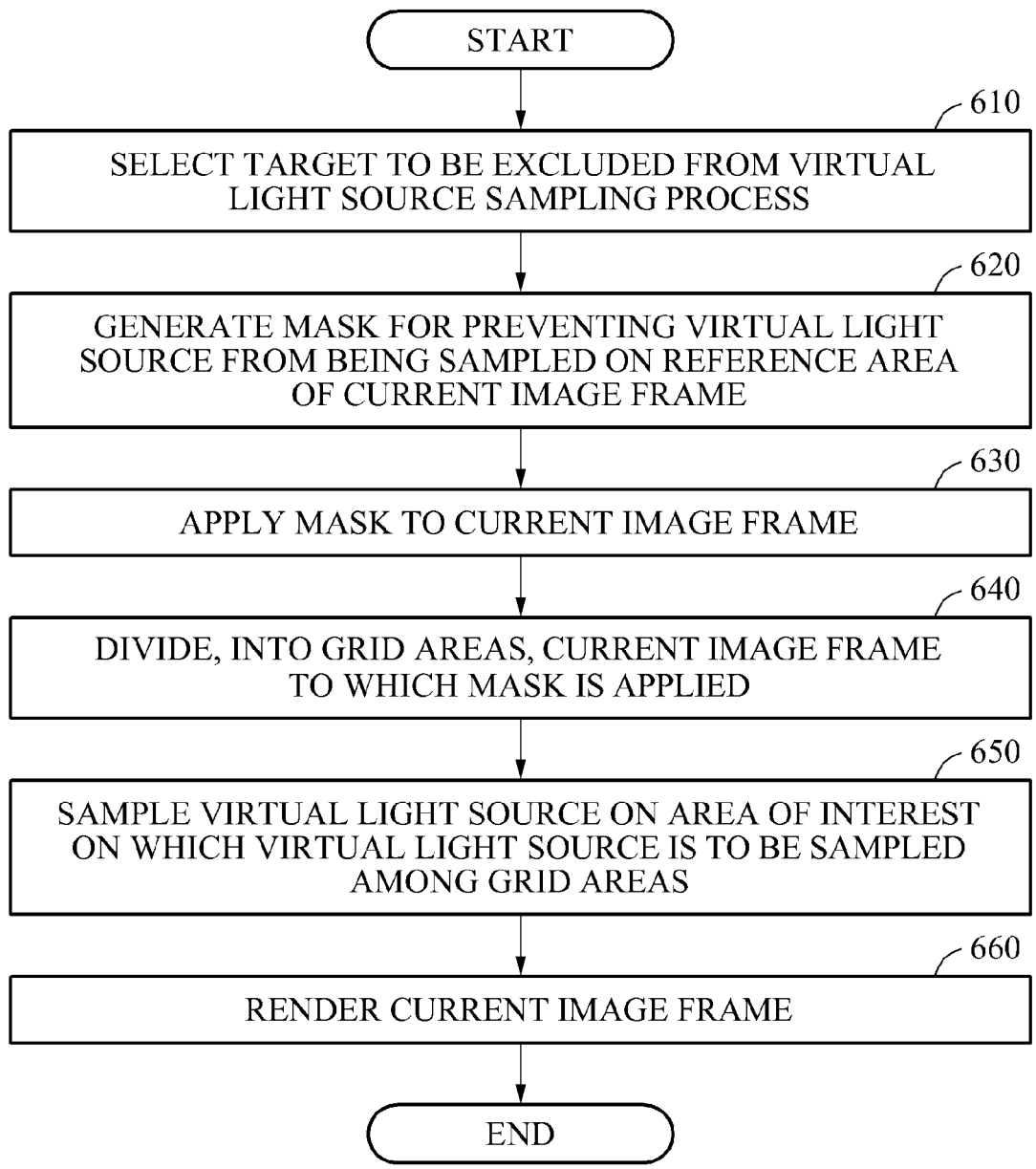
FIG. 6 illustrates another example of an image processing method.

FIG. 6 illustrates another example of an image processing method.

In operation 610, an image processing apparatus according to example embodiments may select a target to be excluded from a virtual light source sampling process and may generate a mask of the selected target. For example, the image processing apparatus may select, as the target to be excluded from the virtual light source sampling process, an area on which a virtual light source is sampled in a previous image frame, a characteristic of the virtual light source such as a predetermined reflection direction, and geometric information of an object model.

In operation 620, the image processing apparatus may generate a mask for preventing a virtual light source from being sampled on an area of the current image frame based on virtual light source information of the previous image frame. The image processing apparatus may generate a mask of the selected target. The image processing apparatus may generate the mask based on at least one of information about an area on which a virtual light source is sampled in the previous image frame, characteristic information of the virtual light source, and geometric information of the object model. For example, the image processing apparatus may identify, from the previous image frame, an area on which a virtual light source is sampled, and may generate a mask for preventing the virtual light source from being sampled on a reference area of the current image frame corresponding to the identified area and a neighboring area of the reference area. The mask may be represented as a texture. For example, the mask may be represented as a texture having a resolution equal to or lower than a resolution of the current image frame.

In operation 630, the image processing apparatus may apply the generated mask to the current image frame. The image processing apparatus may scale a size of the mask based on a size of the current image frame. For example, the image processing apparatus may scale the size of the mask to the size of the current image frame using a hardware acceleration function of a GPU. When applying the mask to the current image frame, the mask may be scaled to the size of the current image frame using the hardware acceleration function of the GPU, and an interpolation operation about the texture may be automatically performed. The scaled mask may mask a reference area of the current image frame and a neighboring area of the reference area. The image processing apparatus may quickly merge a texture of the mask and a texture of the current image frame using the hardware acceleration function of the GPU.

Alternatively, instead of using the texture, the image processing apparatus may apply the mask to the current image frame by storing the mask and the current image frame in a memory space and then blending the mask and the current image frame.

In operation 640, the image processing apparatus may divide, into grid areas, the current image frame to which the mask is applied. The image processing apparatus may select an area of interest on which a virtual light source is to be sampled from among the grid areas.

In operation 650, the image processing apparatus may sample the virtual light source on the area of interest on which the virtual light source is to be sampled among the grid areas. For example, the image processing apparatus may sample the virtual light source based on intensity values of pixels within the area of interest. The image processing apparatus may generate an individual importance map for each area of interest, and may perform importance sampling on an area of interest using the generated importance map. The image processing apparatus may generate importance maps of the areas of interests to be in parallel.

The image processing apparatus may determine the number of virtual light sources to be sampled for each area of interest, and may sample a virtual light source on an area of interest by the determined number of virtual light sources to be sampled. For example, the image processing apparatus may determine the number of virtual light sources to be sampled on the area of interest based on a variety of information in addition to an intensity value distribution, a color distribution, or a flux distribution of the current image frame. For example, the image processing apparatus may determine the number of virtual light sources to be sampled on the area of interest, based on a ratio between an intensity value of the current image frame and an intensity value of the area of interest.

In operation 660, the image processing apparatus may render the current image frame based on the virtual light source to be sampled in the current image frame. The image processing apparatus may apply the virtual light source to be sampled in the previous image frame to the current image frame, and may render the current image frame based on the virtual light source sampled in the area of interest of the current image frame and the virtual light source of the previous image frame applied to the current image frame.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An image processing method comprising:
generating, based on virtual light source information of a previous image frame, a mask configured to prevent a virtual light source from being sampled on a reference area of a current image frame, wherein the reference area of the current image frame corresponds to a first area of the previous image frame where a sampling of the virtual light source was performed;
scaling a size of the mask to a size of the current image frame so that the mask is further configured to prevent the virtual light source from being sampled on a neighboring area of the reference area;
applying the scaled mask to the current image frame;
dividing, into grid areas, the current image frame to which the mask is applied;
selecting a grid area of the grid areas comprising an area of interest on which the virtual light source is to be sampled;
sampling the virtual light source in the area of interest by sampling the virtual light source in a second area of the current image frame, wherein the second area of the current image frame excludes the reference area and the neighboring area to which the mask is applied; and
rendering the current image frame based on a result of the sampling of the virtual light source in the first area in the previous image frame and a result of the sampling of the virtual light source in the second area in the current image frame,
wherein the sampling the virtual light source in the area of interest comprises sampling using an importance sampling.

2. The image processing method of claim 1, wherein the generating of the mask comprises:
identifying, from the previous image frame, the first area.

3. The image processing method of claim 2, wherein the generating of the mask further comprises scaling the size of the mask based on the size of the current image frame, and
the mask prevents the virtual light source from being sampled on the reference area and the neighboring area of the reference area through the scaling.

4. The image processing method of claim 3, wherein the scaling of the size of the mask comprises scaling the size of the mask using a hardware acceleration function of a graphic processing unit (GPU).

5. The image processing method of claim 3, wherein the applying of the mask comprises merging a texture of the current image frame and a texture of the mask using a graphic processing unit (GPU).

6. The image processing method of claim 1, wherein the mask is represented as a low resolution texture.

7. The image processing method of claim 1, wherein the rendering of the current image frame comprises:
applying the virtual light source sampled in the previous image frame to the current image frame; and
rendering the current image frame based on the virtual light source sampled in the current image frame and the virtual light source of the previous image frame applied to the current image frame.

8. The image processing method of claim 1, wherein the reference area is excluded from a virtual light source sampling process of the current image frame.

9. A non-transitory computer-readable medium comprising a program for instructing a computer to perform the method of claim 1.

10. An image processing method comprising:
generating, based on virtual light source information of a previous image frame, a mask configured to prevent a virtual light source from being sampled on a reference area of a current image frame corresponding to an area on which the virtual light source was sampled in the previous image frame;
applying the mask to the current image frame;
dividing, into grid areas, the current image frame to which the mask is applied;
selecting a grid area of the grid areas comprising an area of an interest on which the virtual light source is to be sampled;
sampling the virtual light source on the area of interest of the selected grid area;
rendering the current image frame based on the virtual light source sampled in the previous image frame and the virtual light source sampled in the selected grid area of the current image frame,
wherein the area of interest excludes an area to which the mask is applied, and
wherein the sampling the virtual light source in the area of interest comprises sampling using an importance sampling.

11. The image processing method of claim 10, wherein the sampling of the virtual light source comprises:
determining a number of virtual light sources to be sampled on the area of interest; and
sampling the virtual light source on the area of interest by the determined number of virtual light sources to be sampled.

12. The image processing method of claim 11, wherein the determining of the number of virtual light sources comprises:
determining the number of virtual light sources to be sampled on the area of interest based on at least one of a light intensity distribution, a color distribution, and a flux distribution of the current image frame.

13. The image processing method of claim 10, wherein the generating of the mask comprises:
identifying, from the previous image frame, the area on which the virtual light source is sampled in the previous image frame; and
generating the mask configured to prevent the virtual light source from being sampled on the reference area of the current image frame corresponding to the identified area and a neighboring area of the reference area.

14. An image processing apparatus comprising:
one or more processors configured to:

generate, based on virtual light source information of a previous image frame, a mask for preventing a virtual light source from being sampled on a reference area of a current image frame corresponding to an area on which the virtual light source was sampled in the previous image frame, wherein the reference area of the current image frame corresponds to a first area of the previous image frame where a sampling of the virtual light source was performed;

scale a size of the mask to a size of the current image frame so that the mask is further configured to prevent the virtual light source from being sampled on a neighboring area of the reference area;

divide, into grid areas, the current image frame to which the mask is applied;

select a grid area of the grid areas comprising an area of interest on which the virtual light source is to be sampled;

sample the virtual light source in the area of interest by sampling the virtual light source on a second area of the current image frame, wherein the second area of the current image frame excludes the reference area and the neighboring area to which the mask is applied; and render the current image frame based on a result of the sampling of the virtual light source in the first area in the previous image frame and a result of the sampling of the virtual light source in the second area in the current image frame, wherein the sampling the virtual light source in the area of interest comprises sampling using an importance sampling.

15. The image processing apparatus of claim 14, wherein, to generate the mask, the one or more processors are further configured to:

identify, from the previous image frame, the first area.

16. The image processing apparatus of claim 14, wherein the mask is represented as a low resolution texture, and the size of the mask is scaled using a hardware acceleration function of a graphic processing unit (GPU) in response to applying the mask to the current image frame.

17. The image processing apparatus of claim 14, wherein, to perform the virtual light source sampling, the one or more processors are configured to selectively perform virtual light source sampling with respect to the grid areas.

18. The image processing apparatus of claim 17, wherein, to perform the virtual light source sampling, the one or more processors are further configured to sample the virtual light source on an area of interest on which the virtual light source is to be sampled among the grid areas.

19. The image processing apparatus of claim 17, wherein, to perform the virtual light source sampling, the one or more processors are further configured to sample the virtual light source on an area of interest on which the virtual light source is to be sampled based on the determined number of virtual light sources to be sampled.

* * * * *